May 21, 1935.  P. E. HALL  2,002,006
BRAKE
Filed Sept. 3, 1932
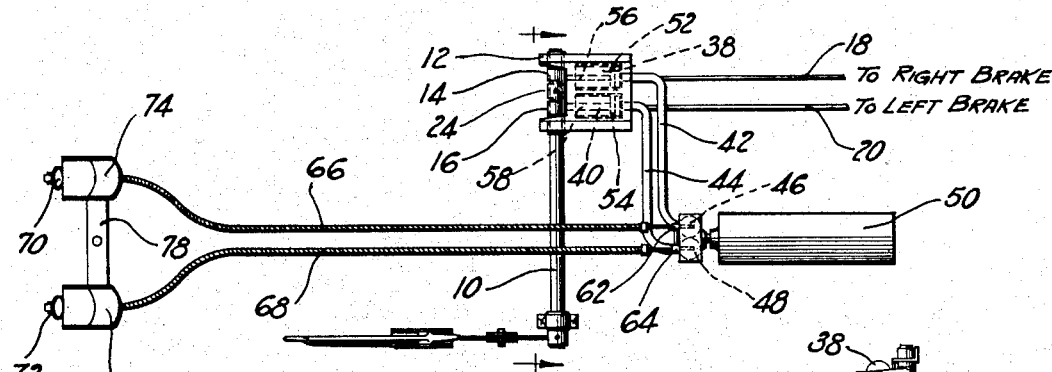
FIG.1
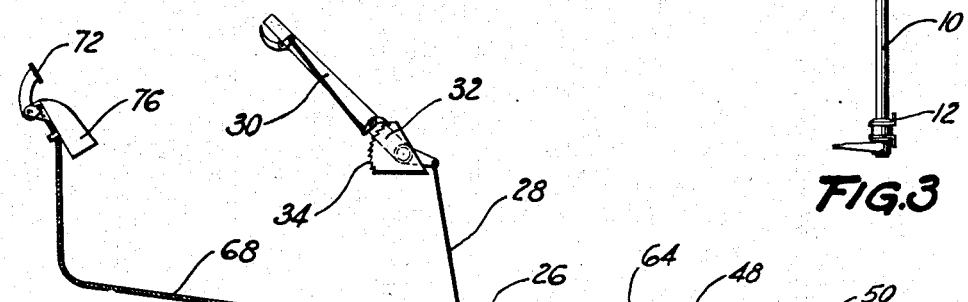
FIG.2
FIG.3
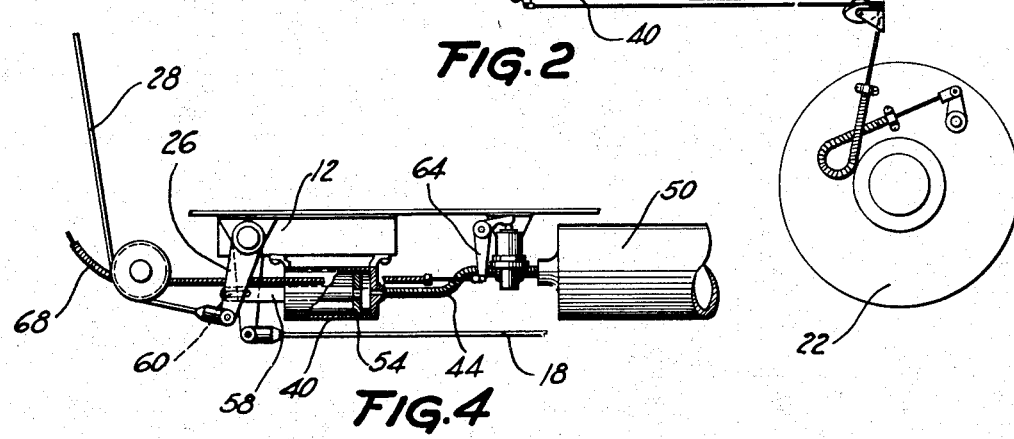
FIG.4
INVENTOR.
PERCY EDGAR HALL
BY  J. H. Fowler
ATTORNEY Patented May 21, 1935

2,002,006

UNITED STATES PATENT OFFICE 2,002,006

BRAKE

Percy Edgar Hall, Birmingham, England, assignor to Bendix Aviation Corporation, South Bend, Ind., a corporation of Delaware Application September 3, 1932, Serial No. 631,686
In Great Britain September 4, 1931

3 Claims. (Cl. 244—2)

This invention relates to brakes and more particularly to controls for operating brakes for the landing wheels of aircraft.

It is highly desirable that controls for the brakes of the landing wheels of aircraft be operated from the rudder bar, equally or unequally to facilitate manoeuvring of the aircraft on the ground, and also that the brakes may be applied by hand and retained in applied position when the airplane is stationary.

An object of the invention is to provide brake controls for fulfilling these requirements in a very simple and effective manner, and which may be readily applied to aircraft of various types and designs.

Other objects of the invention will appear from the following description taken in connection with the drawing, which forms a part of this specification, and in which:

Figure 1 is a diagrammatical illustration of a brake control system embodying the invention;

Figure 2 is a side elevation;

Figure 3 is a section substantially on the line indicated by the arrows in Fig. 1; and Figure 4 is an enlarged detail view.

In the embodiment shown, the brakes for the landing wheels of an airplane are adapted to be applied by mechanical means from levers rockable on a stationary shaft, and the levers are arranged to be moved independently by pneumatic means controlled through pedals on a rudder bar, or to be moved simultaneously by means of a hand lever, both brakes being applied with the same force when the hand lever is operated.

In a preferred arrangement, a stationary shaft 10 is supported by suitable brackets 12 which may be secured to the floor boards of an airplane, not shown. The shaft has sleeved thereon spaced levers 14 and 16 connected respectively through cables 18 and 20 to the respective brakes associated with the wheels of an airplane, only one of which is shown at 22. The brakes may be of any conventional type.

Positioned for rotation on the shaft 10 between the levers 14 and 16 is a lever 26 provided with a pick-up dog 24 connecting it with the levers 14 and 16 to rock these levers in a clockwise direction only. The lever 26 is connected through a cable 28 to a hand operated lever 30 pivoted on a fixed support 32, and associated with the hand operated lever is a ratchet segment 34 adaptable for cooperation with a pawl carried by the lever, so that the lever may be locked against movement.

When the hand operated lever is rocked to impose tension on the cable 28, the lever 26 is rocked in a clockwise direction, and this movement rocks the levers 14 and 16 which through the cables or tension members 18 and 20 effectively actuates the brakes.

One of the brackets 12 supports two operating cylinders 38 and 40 connected respectively by pipe lines 42 and 44 to valves 46 and 48 on a compressed air reservoir 50. The operating cylinders have pistons 52 and 54 provided with rods 56 and 58 attached by over-running connections 60 to the levers 14 and 16 to rock these levers in one direction only, to tension the cables 18 and 20 for actuation of the brakes.

The operating cylinders 38 and 40 are connected through valves 46 and 48 to the compressed air reservoir 50 and these valves are adaptable for actuation simultaneously or independently by levers 62 and 64 connected through cables 66 and 68 to suitable levers 70 and 72 arranged on rudder pedals 74 and 76 on the respective ends of a rudder bar 78 of the conventional type.

By actuating the levers 70 and 72 on the pedals 74 and 76 the brakes may be applied independently or simultaneously, or they may be applied with the same or with different force by movement of the levers on the pedals.

It is, of course, understood that when the plane is stationary, both brakes will normally be applied through the hand lever, and should there be a failure of the pneumatic system at any time, the brakes can of course be applied by means of the hand lever when the plane is in motion on the ground.

Although this invention has been described in connection with certain specific embodiments, the principles involved are susceptible of numerous other applications readily occurring to persons skilled in the art. The invention is, therefore, to be limited only as indicated by the scope of the appended claims.

Having thus described the various features of the invention what I claim as new and desire to secure by Letters Patent is:

1. A control mechanism for airplanes comprising a rudder bar, a compressed air reservoir having a pair of valves, members connecting the respective ends of the rudder bar to the respective valves for actuation from the rudder bar, operating cylinders connected to the reservoir through the valves, a rock shaft, levers pivoted on the rock shaft and connected to the pistons of the operating cylinders, a pair of brakes, tension members connecting the levers to the brakes, and mechanical means for rocking the shaft to actuate the tension members to apply the brakes simultaneously.

2. A control mechanism for airplanes comprising a rudder bar, a compressed air reservoir having valves, members connecting the respective ends of the rudder bar to the respective ends of the respective valves, operating cylinders connected to the reservoir through the valves, a rock shaft, levers pivoted thereon and connected to the pistons of the operating cylinders, a pair of brakes, tension members connecting the levers to brakes, and mechanical means for rocking the shaft to actuate the tension members and apply the brakes simultaneously.

3. A control mechanism for airplanes comprising a rudder bar, a compressed air reservoir having a pair of valves, means connecting the respective ends of the rudder bar to the respective valves for independent or simultaneous actuation, a pair of operating cylinders connected to the reservoir through the valves, a rock shaft, spaced levers pivoted thereon, means connecting the respective levers to the pistons of the operating cylinders, a pair of brakes, means connecting the brakes to the levers and mechanical means for rocking the shaft to actuate the levers and apply the brakes simultaneously.

PERCY EDGAR HALL.